United States Patent

LaPoint et al.

[11] Patent Number: 5,086,988
[45] Date of Patent: Feb. 11, 1992

[54] CAR COVER DEPLOYMENT AND STORAGE SYSTEM

[76] Inventors: David A. LaPoint, 11 Cintilar, Irvine, Calif. 92720; James P. LaPoint, 48 Country La.; J. Philip LaPoint, 17 Coral Tree La., both of Rolling Hills Estates, Calif. 90274

[21] Appl. No.: 486,956

[22] Filed: Mar. 1, 1990

[51] Int. Cl.⁵ ............................................. B65H 75/40
[52] U.S. Cl. ..................................................... 242/96
[58] Field of Search ............. 242/96, 125.1, 55, 86.52; 296/136

[56] References Cited

U.S. PATENT DOCUMENTS

| | | |
|---|---|---|
| 1,912,231 | 12/1931 | Wandscheer . |
| 2,683,000 | 7/1954 | Beiderwell ............ 242/96 |
| 2,898,607 | 8/1959 | McGuire . |
| 3,423,044 | 1/1969 | Beiderwell ............ 242/96 |
| 3,481,557 | 12/1969 | Miller .................... 242/96 |
| 3,747,132 | 7/1973 | Foster . |
| 3,970,264 | 7/1976 | Fredriksson .......... 242/96 |
| 4,154,254 | 5/1979 | Spencer . |
| 4,160,532 | 7/1979 | Demuth et al. ..... 242/125.1 |
| 4,216,989 | 8/1980 | Tackett ................ 296/136 |
| 4,222,032 | 9/1980 | Speer . |
| 4,274,077 | 6/1981 | Felger . |
| 4,324,370 | 4/1982 | Guard et al. ...... 242/86.52 |
| 4,422,193 | 12/1983 | Kravath ................ 4/505 |
| 4,429,839 | 2/1984 | Jessamine ............. 242/96 |
| 4,432,581 | 2/1984 | Guma ................... 296/136 |
| 4,459,711 | 7/1984 | Sartain et al. ......... 4/502 |
| 4,467,978 | 8/1984 | Farrington .......... 242/86.52 |
| 4,471,500 | 9/1984 | Long et al. ............. 4/499 |
| 4,480,800 | 11/1984 | Oberg et al. ......... 242/55 |
| 4,656,320 | 4/1987 | Maddock ............ 242/96 X |
| 4,657,298 | 4/1987 | Yong O ................ 296/136 |
| 4,685,634 | 8/1987 | Schwartz ............... 242/96 |
| 4,720,135 | 1/1988 | Farina .................. 296/136 |
| 4,764,998 | 8/1988 | Norris et al. .......... 4/502 |

FOREIGN PATENT DOCUMENTS

| | | |
|---|---|---|
| 2731951 | 2/1979 | Fed. Rep. of Germany . |
| 2900243 | 7/1979 | Fed. Rep. of Germany . |
| 56-160215 | 2/1981 | Japan . |
| 8302098 | 1/1983 | Netherlands . |
| 8503911 | 9/1985 | PCT Int'l Appl. . |

OTHER PUBLICATIONS

Advertisement Brochure Disclosing Quickover.
Los Angeles Times, Article Written by Lynn Simross Entitled, "Convertible Cover-Up for Pickups".

Primary Examiner—John M. Jillions
Attorney, Agent, or Firm—Knobbe, Martens, Olson & Bear

[57] ABSTRACT

A car cover storage device for allowing easy, quick and convenient storage of a car cover. The car cover storage device of the present invention comprises a container having an opening with a axle disposed within. The axle is rotated by applying pressure on a handle which is connected to the axle. As the handle is rotated, the car cover is easily retracted through the opening to wrap around the axle. The car cover storage device eliminates awkward folding and unfolding of the car cover and allows the car cover to be conveniently stored in the trunk of the car or in some location remote from the car.

5 Claims, 3 Drawing Sheets

CAR COVER DEPLOYMENT AND STORAGE SYSTEM

BACKGROUND OF THE INVENTION

1. Field of the Invention

This invention relates generally to car covers. More particularly, this invention relates to an improved car cover deployment and storage system.

2. Description of the Related Art

With the escalating cost of automobiles, car owners are taking more precautionary measures to preserve their car,s condition. The use of car covers is widespread for protection of cars from dust and debris, which contribute to the deterioration of a car,s paint finish. In the sunbelt areas, car owners who do not have access to a covered parking space often resort to the use of a car cover to protect their cars from the damaging effects of the sun. Further, the use of car covers is also customary to discourage theft and vandalism.

Available covers which cover the entire body of the car are generally stored in a stuff bag which is, in turn, stored within the trunk of the vehicle. The storage of car covers in this manner requires awkward bunching and stuffing of the car cover into the bag when the car cover is removed from the vehicle. Because this procedure involves significant time and effort on the part of the car owner, the car owner will often leave the car exposed, rather than struggling with the cover.

In an effort to address this problem, U.S. Pat. No. 4,720,135 teaches the use of a protective device including a protective sheet for covering the upper surface of the body of a motor vehicle. The sheet is anchored at one end to a winding roller which is fixed permanently to the vehicle in the region of one of it bumpers and is provided at its other end with means for attachment to the region of the other bumper. This protective device has many disadvantages. The protective device only covers the top of the car, leaving the sides exposed to dust and the elements. Likewise, since the doors and side windows of the vehicle are exposed, the protective device does little to discourage theft or vandalism. Finally, since the device is mounted near the vehicle's bumper, it is apt to be damaged in collision.

U.S. Pat. No. 4,657,298 discloses another protective device for a car which includes a sheet of material wound around a roller and a surrounding container which is permanently mounted within the trunk of the vehicle. The sheet member is extended from the roller to cover the roof and hood of the vehicle. A motor is used to retract the sheet into the container for storage. This design is undesirable in that the device is relatively large, heavy and expensive, while leaving the back and sides of the car exposed to intruders and the elements.

U.S. Pat. No. 4,216,989 discloses a pop-up cover mechanism for covering the full body of the vehicle. The full cover is stored within a protective storage compartment which is mounted on the roof of a car. The storage compartment can be opened to release the protective sheet when it is desired to cover the car. An end of the protective sheet remains attached to the storage compartment, allowing the storage compartment to hold the protective sheet in place. Unfortunately, while the device provides for a somewhat elaborate deployment mechanism, the device is permanently attached to the center of the roof of the car, forming a large raised block portion, which is aesthetically undesirable. Further, the device requires that the design of the vehicle itself be altered or, in one embodiment, that holes be drilled into the roof of the car in order to mount the storage compartment on the car. This device is relatively expensive and has not proved popular among car owners.

There is needed a car cover deployment and storage system which is light, simple to use and manufacture, inexpensive, reliable, compact and which does not detract from the aesthetic appearance of the vehicle.

SUMMARY OF THE INVENTION

The present invention provides a car cover deployment and storage system of novel design which allows an owner to quickly and conveniently remove a full body car cover from the vehicle and store it in the storage device within the car or in a location remote from the car.

The car cover deployment and storage system includes a car cover having a cord along its periphery for securing the cover around the body of a car and a container having a top, a bottom and a side wall connecting the top and bottom. An axle is secured within the container so as to extend between the top and bottom of the container. The side wall defines an opening through which the cord extends and a holder is provided to secure a portion of the car cover's cord to the axle so that the rotation of the axle will result in the cord being wound around the axle. A connector is secured to the axle and at least a portion of the connector extends outside of the container and is radially displaced from the axis of rotation of the axle so that the rotation of a handle secured to the portion of the connector which is outside of the container and radially displaced from the axis of rotation of the axle will be facilitated by the lever action of the arrangement.

The rotation of the handle about the axis of the axle results in a portion of the car cover being gathered by the portion of the side wall defining the opening. The gathered portion of the car cover is then drawn through the opening and wound around the axle. Advantageously, the opening has a height roughly equal to the height of the axle, thereby providing for the compact and even winding of the car cover about the axle, thereby eliminating tangles and knots which otherwise occur if the layers of the car cover were crossed next to and over one another.

The car cover deployment and storage system of the present invention provides a quick and easy means for the vehicle owner to deploy and remove the car cover, thereby increasing the likelihood that the car cover will be deployed and provide the desired protection against theft and the elements. Contrary to many prior art car cover deployment systems, the present system is able to provide the desired capability of quick and easy deployment and removal of the car cover, without altering the structural design or aesthetic appearance of the vehicle.

Since no part of the car cover deployment and storage system is mounted on the vehicle when the vehicle is in motion, the system is unlikely to be damaged by minor accidents. Likewise, since the car cover deployment system is not secured to the vehicle, no time is required for installment.

Another significant aspect of the invention is a car cover storage device which provides a superior combination of compactness and ease of use. Since the configuration of the device is particularly adapted to be molded from rigid plastic, the storage device is both strong and lightweight. Furthermore, due to its structural configuration and the ease with which the storage device can be manufactured, the device can be manufactured at a relatively low cost.

Finally, in its preferred form, the car cover storage device is fully enclosed except for the opening in the side wall, thereby protecting a car cover stored within the device from grease and tearing during storage.

The objects and other advantages of the present invention will become apparent from the following detailed description, considered together with the appended drawings.

DESCRIPTION OF THE PREFERRED EMBODIMENT

Figure 1:
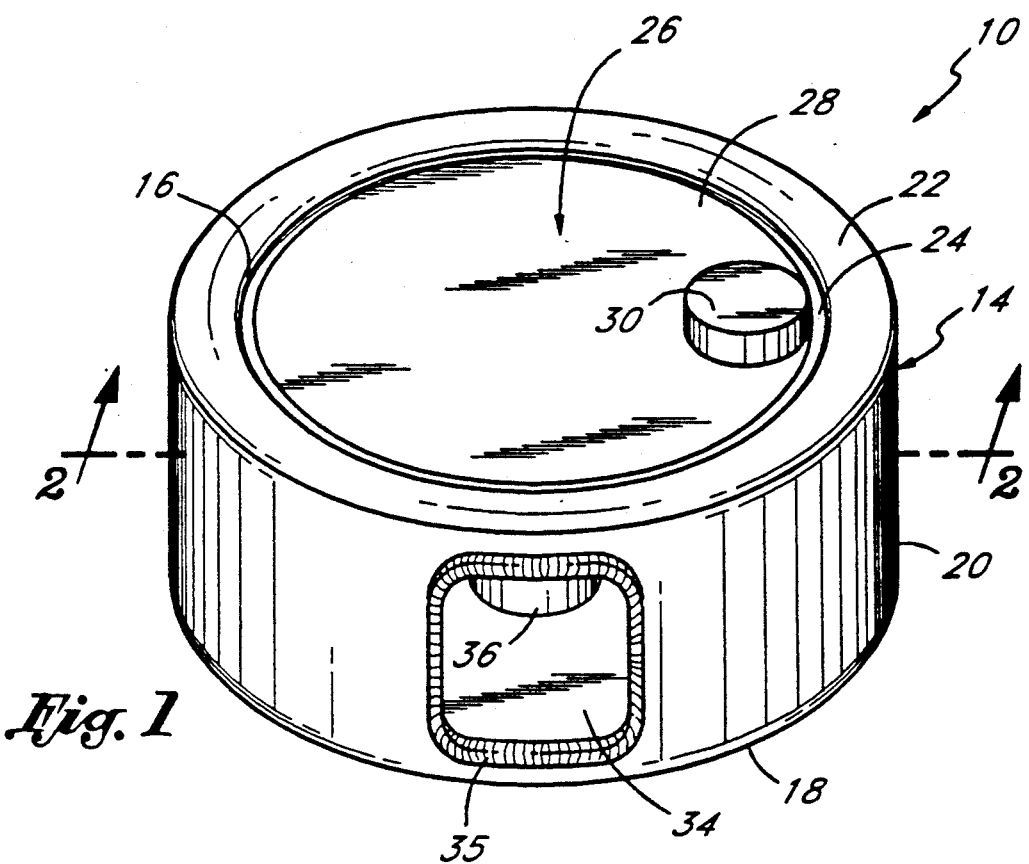
FIG. 1 is a perspective view of a car cover storage device constructed in accordance with the preferred embodiment of the present invention.
Figure 2:
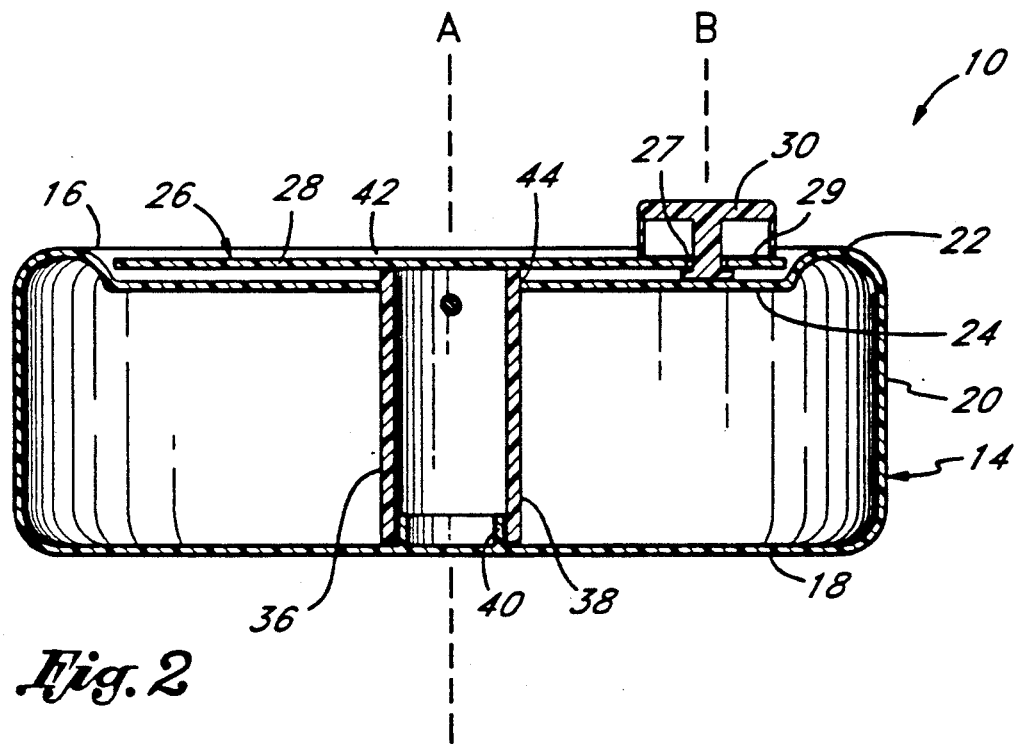
FIG. 2 is a cross-sectional view of the preferred embodiment of the car cover storage device of the present invention, taken along line 2—2.
Figure 3:
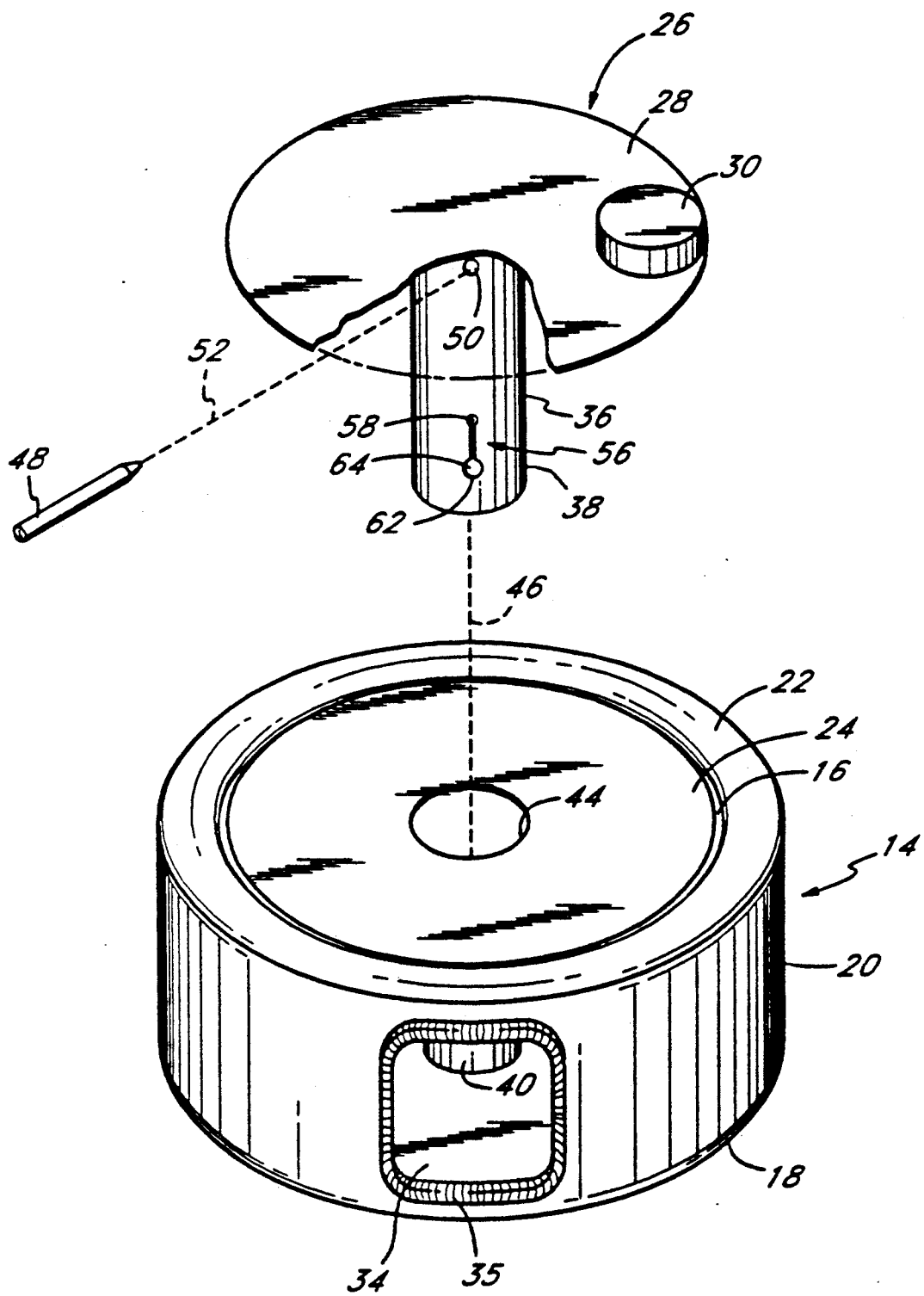
FIG. 3 is an exploded view of the preferred embodiment of the car cover storage device of the present invention, illustrating the manner in which the axle is mounted within the container.
Figure 4:
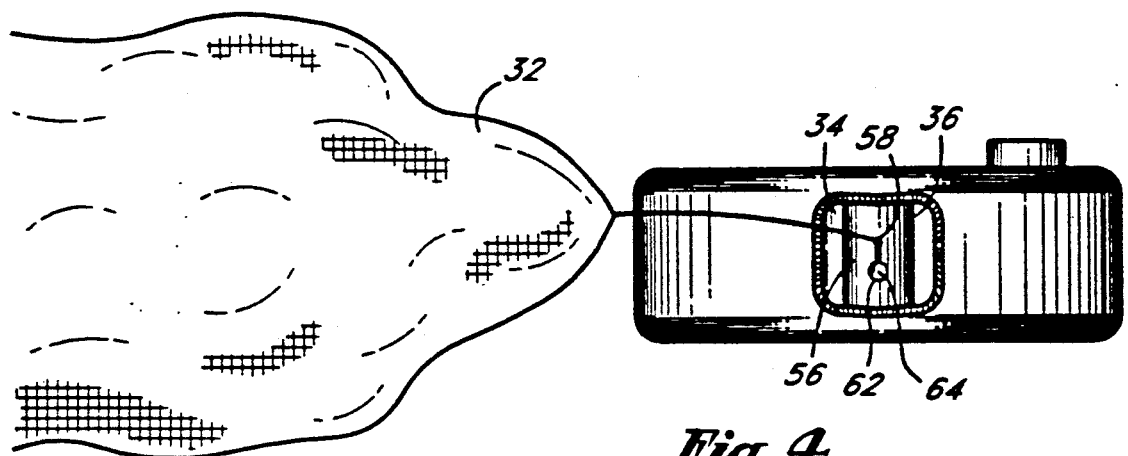
FIG. 4 is a side view of the preferred embodiment of the car cover deployment and storage system of the present invention, illustrating a car cover attached by a cord to the car cover storage device.
Figure 5:
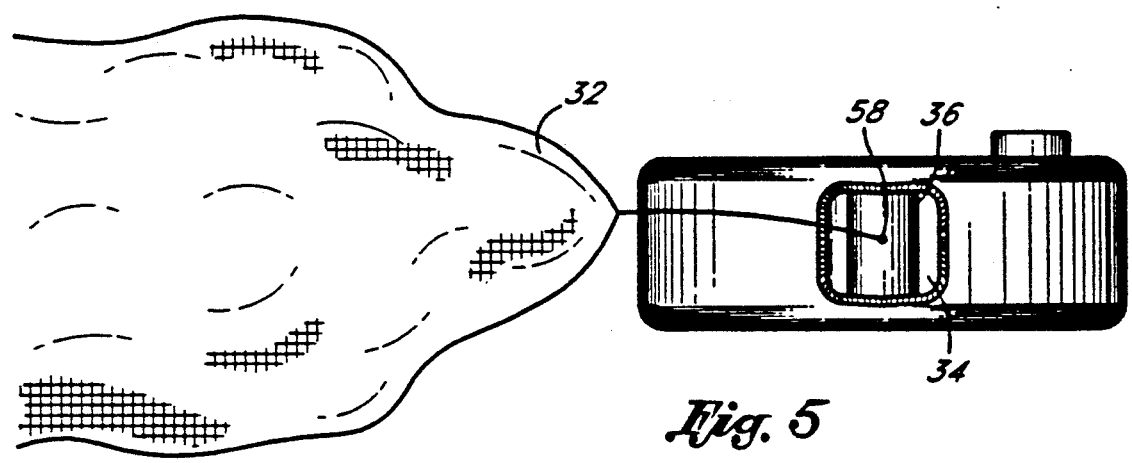
FIG. 5 is a side view of an alternative embodiment of the car cover deployment and storage system of the present invention, illustrating a car cover attached by a cord to the car cover storage device.
Figure 6:
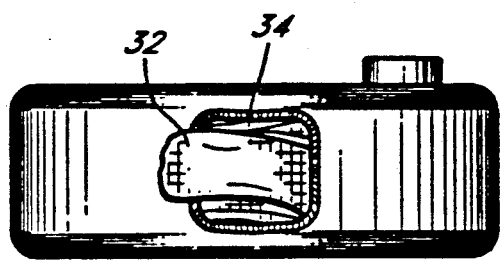
FIG. 6 is a front view of the car cover deployment and storage system of the present invention, illustrating the storage of the car cover within the device of FIG. 1.

Referring now to the drawings in detail, wherein like reference numerals designate like elements throughout the several views thereof, there is shown generally at 10 in FIGS. 1, 2, and 3, a car cover storage device of the car cover deployment and storage system of the present invention in a preferred form. For clarity of illustration, the car cover storage device 10 is depicted in FIGS. 1-5 without a car cover stored inside. However, as illustrated in FIGS. 4-6, the car cover deployment and storage system includes a full car cover 32 (i.e., a car cover which, when deployed, surrounds and covers essentially the entire body of the vehicle, including the sides) having a cord 54 along its periphery which is used to secure the cover in place over the vehicle's body.

As depicted in the drawings, the car cover storage device includes a container 14 of a generally cylindrical shape. This cylindrical shape provides the most efficient use of space for the present design. However, those of ordinary skill in the art will appreciate that the container 14 can be any of a variety of other shapes. As best seen in FIG. 3, the container 14 includes a generally flat top 16, a generally flat bottom 18 and a cylindrical side wall 20. The top 16 includes an outer annular ridge 22 extending radially inward, generally perpendicular to the side wall 20, and a recessed disk-shaped central portion 24 defining an aperture 44 at its center.

It will be appreciated that the optimal dimensions of the container 14 will depend upon the size and type of material from which the car cover is constructed. The container has a preferred height and diameter of 6 inches and 13½ inches, respectively, corresponding to a standard car cover made for a car up to approximately 16 feet in length. For larger car covers, the dimensions of the container should be increased by about 10 percent.

As best seen in FIG. 3, the aperture 44 mates with a rotating assembly 26. The assembly 26 includes an axle 36, a circular connector or plate 28 and a set pin 48. The axle 36 is affixed to the central plate 28 by any conventional technique. In an exemplary embodiment, the axle 36 is glued to the plate 28. When the axle 36 extends between the top 16 and bottom 18 of the container, through an opening 44 formed in the recessed portion 24. In the preferred embodiment, the axle 36 is cylindrical in shape and is hollow, providing a flat even surface for the car cover to be wrapped around. The axle 36 is mounted to the bottom 18 of the container 14 at its base 38. The inside of the bottom 18, at its center, is secured a raised annular pivot 40. The axle 36, at its base, rotatably fits over the pivot 40, so that the axle rotates about its own axis A. In the preferred embodiment, the knob 30 is mounted so as to rotate about its vertical axis B. The knob 30 is mounted on the plate 28 through a hole 27 in the plate 28 located proximate to the edge of the plate 28. The knob 30 is secured to the plate 28 by a flange portion 29 on the knob 30 on the under side of the plate 28. The flange portion 29 has a diameter greater than the diameter of the hole 27. The flange portion 29 thus prevents the removal of the knob 30 from the plate 28. In the preferred embodiment, the distance between the axis of the axle A and the axis of the handle B is four inches, thereby providing a lever action which facilitates the user's manual rotation of the axle. This distance has been found to provide the desired mechanical advantage while maintaining the compactness of the design.

The side wall 20 has an entry hole or opening 34 which is suitably sized and shaped to allow the car cover 32 to be drawn through the opening 34. In the preferred embodiment, the opening 34 is preferably square or rectangular in shape with rounded corners. It is believed that this shape is most effective in collapsing the bulky folds of the car cover 32 such that it has a suitable width which can be easily and efficiently accommodated within the container 14. In the preferred embodiment of the present invention, the height and width of the opening 34 is approximately 4 inches. The radius of the rounded corners of the opening 34 is preferably ⅜ inches. As discussed below in greater detail, it is an important aspect of the invention that the opening, and thus the gathered portion of the car cover drawn through the opening have a height roughly equal to the height of the axle.

The opening 34 has an outer lip 35 along its perimeter. The outer lip 35 is a separately formed piece which is somewhat flexible so that it may be installed around the perimeter of the opening 34. The outer lip 35 has radial ridges to allow it to bend more easily at the rounded corners of the opening 34. The outer lip 35 is curved in a U-shape to cover the inside and outside edges of the opening 34. The outer lip 35 advantageously protects the car cover 32 from any sharp edges of the portion of the side wall 20 defining the opening 34 which may scrape or tear the car cover 32 as it is drawn into or out of the opening 34.

As illustrated clearly in the exploded view of FIG. 3, the axle 36 mounted to the plate 28 is inserted through the opening 34 along the broken line 46. Once the axle 36 is suitably mounted over the pivot 40, the pin 48 extending through an aperture 50 in the rod member 36, as shown along line 52, holds the axle 36 securely in place. The pin 48 in the preferred embodiment is pencil-shaped, in that it is slim, cylindrical in shape with a tapered end for easy insertion into the aperture 50.

As illustrated in FIGS. 4 and 5, the car cover 32 is attached to the axle 36 by the cord 54, or other string-like member sufficiently durable to pull the car cover into the container 14. The cord 54 is knotted at one end (not shown) and inserted through a slot 56 formed in the axle 36. In the preferred embodiment, shown in FIG. 4, the slot 56 at its upper end 58 terminates in a small circular upper opening 60 and likewise at it lower end 62 in a lower opening 64 of relatively larger diameter. The knotted end 55 is easily inserted through the lower opening 64 and is slid upward to the upper opening. The knotted end 55 has a larger diameter than that of the upper opening 60 which prevents the cord 54 from slipping out. Advantageously, the car cover 32 may be easily detached from the axle 36 by sliding the cord 54 through the slot 56 and out from the lower opening 64.

In an alternative embodiment, as illustrated in FIG. 5, the cord 54 may be permanently fastened to the container 14 by inserting the cord 54 through an aperture 58 during the manufacturing process and tying a knot to secure the cord 54 to the axle 36.

In use, once the cord 54 has been securely attached to the axle 36, the knob 30 is gripped and rotated, causing the axle 36 which is attached to the plate 28 to rotate about the pivot 40. As the axle 36 rotates, it pulls the cord 54 which wraps around the axle 36 and causes the car cover 32 to be retracted through the entry opening 34. The portion of the side wall surrounding the opening 34 and the outer lip 35 automatically gather the car cover and force the car cover to collapse to a suitable size and width allowing the car cover to wrap around the axle 36 until the car cover is completely accommodated within the hollow container 14. The size of the opening 34 is chosen such that the car cover is gathered and forced into a dimension which fits efficiently within the container 14 so that nearly all of the space is occupied by the car cover and little space is wasted. The size of the opening 34 is large enough that it does not compact the car cover so that the car cover blocks the opening 34 and delays loading of the car cover. FIG. 6 illustrates the car cover storage device 10 as the last of the car cover 32 is taken in.

As discussed above, preferably, the opening has a height roughly equal to the height of the axle so that the gathered portion of the car cover will have a height roughly equal to that of the axle, providing for the even winding of the car cover about the axle, eliminating tangles and knots which might otherwise occur if the layers of car cover were crossed next to and over each other.

When it is desired to remove the car cover 32 from the container 14, the end of the car cover 32 is manually pulled through the opening 34. As the car cover 32 continues to be pulled out, the car cover unwinds from the axle 36, causing it and the plate 28 to rotate. After the car cover has been completely removed from the container 14, the cord 54 will remain. The cord 54 can then be unsecured and removed from the axle 36. The container 14 may then be conveniently stored until it is later desired to be used to again store the car cover 32.

In an embodiment in which the cord 54 cannot be removed from the axle 36, the container can be placed in the trunk of the car or otherwise next to the car cover until it is desired to be used to again store the car cover 32.

The design of the preferred embodiment is chosen so that it contains only a few simple parts. The few simple parts make the device easy and inexpensive to manufacture. The few simple parts and ease of manufacture increase the reliability of the device. The shape and size of the device are chosen so that the device is as small as possible while effectively and easily storing a car cover. Additionally, the design makes the device aesthetically pleasing and easy to handle.

Although certain specific embodiments of the invention have been shown and described, it should be readily apparent that many modifications are possible. The invention is therefore not intended to be restricted to the exact showing of the drawings and description thereof, but is considered to include reasonable and obvious equivalents.

What is claimed is:

1. A car cover deployment and storage system, comprising:

a car cover having a cord along its periphery for securing said cover around the body of a car;

a plastic container having a top, a bottom and a side wall connecting said top and said bottom, a portion of said side wall defining an opening, wherein said top defines an outer annular ridge and a recessed disk-shaped central portion defining an aperture at its center;

a raised pivot secured within said container to the bottom of said container;

a rotating assembly including a plastic circular plate, a setting device and a plastic cylindrical axle having a pair of ends extending from said bottom of said container through said aperture in said top of said container, one of said pair of ends being rotatably secured to said pivot, another of said pair of ends of said axle extending through said aperture, said circular plate being affixed to said another of said pair of ends and positioned within said recessed disk-shaped central portion and said setting device secured to said axle within said container and adjacent to said to pof said container to secure said axle within said container, yet permit said axle to rotate about an axis;

a holder for securing a portion of said cord to said axle;

a handle secured to said circular plate displaced from said axis, wherein the rotation of said handle about said axis results in a portion of said car cover being gathered by said portion of said side wall defining said opening, being drawn through said opening and being wound around said axle, said opening sized and shaped so that the gathered portion of said car cover drawn through said opening has a height roughly equal to the height of the axle, thereby providing for the compact and even winding of said car cover about said axle within said container; and, a raised curved lip surrounding the periphery of said opening to facilitate the smooth gathering of said car cover by said portion of said side walls surrounding said onpening and to prevent sharp edges from damaging teh car cover as it is drawn through the opening.

2. The car cover depolyment and storage system of claim 1, wherein said holder comprises a slot in said cylindrical axle having a wider end and a narrower end, said wider end having a width sufficiently wide to permit a knotted end of said cord to be inserted through said wider end and said narrower end having a width sufficiently narrow to prevent said knotted end from being withdrawn through said narrower end.

3. The car cover deployment and storage system of claim 1, wherein said lip comprises a separately formed plastic piece having radial ridges to allow it to bend more easily at the rounded corners of the opening.

4. A car cover storage device for storing a car cover having a cord along its periphery for securing said cover around the body of a vehicle, comprising:

a plastic container having a generally flat top, said top defining an annular ridge and a recessed disk-shaped central portion which efines an aperture at its center, a generally flat bototm and a cylindrical side wall connecting said top and said bottom, a portion of said side wall defining an opening;

a raised pivot secured to said bottom wall vertically aligned with said aperture;

a rotating assembly including a plastic circular plate, a setting device and a plastic cylindrical axle having a pair of ends extending from said bottom of said container through said aperture in said top of said container, one of said pair of ends being rotatably secured to said pivot, another of said pair of ends of said axle extending through said aperture, said circular plate being affixed to said another of said pair of ends and positioned within said recessed disk-shaped central portion and said setting device secured to said axle within said container and adjacent to said top of said container to secure said axle within said container, yet permit said axle to rotate about an axis;

a holder for securing a portion of a cord secured along the periphery of a car cover to said axle;

a handle secured to said circular plate displaced from said axis, wherein the rotation of said handle about said axis results in a portion of said car cover being gathered by said portion of said side wall defining said opening, being drawn through said opening and being wound around said axle; and, a protective lip surrounding the opening in said container, said protective lip protecting said car cover from sharp edges along said opneing as said car cover is being drawn through said opening.

5. The car cover deployment and storage system of claim 4, wherein said lip comprises a separately formed plastic piece having radial ridges to allow it to bend more easily at the rounded corners of the opening.

* * * * *

UNITED STATES PATENT AND TRADEMARK OFFICE
CERTIFICATE OF CORRECTION

PATENT NO. : 5,086,988
DATED : February 11, 1992
INVENTOR(S) : LaPoint, et al.

It is certified that error appears in the above-indentified patent and that said Letters Patent is hereby corrected as shown below:

Column 6, line 44, change "said to pof said " to --said top of said--

Column 6, line 64, change "said onpening " to --said opening--

Column 6, line 65, change "damaging teh," to --damaging the--

Column 7, line 16, change "which efines," to --which defines--

Column 7, line 17, change "flat bototm," to --flat bottom--

Column 8, line 20, change "said opneing," to --said opening--

Signed and Sealed this

Twenty-sixth Day of August, 1997

Attest:

BRUCE LEHMAN

Attesting Officer

Commissioner of Patents and Trademarks